United States Patent [19]

Kelling

[11] 4,397,288
[45] Aug. 9, 1983

[54] DIESEL FUEL WARMER

[75] Inventor: Gordon L. Kelling, Minnetonka, Minn.

[73] Assignee: Phillips Temro, Inc., Eden Prairie, Minn.

[21] Appl. No.: 259,473

[22] Filed: May 1, 1981

[51] Int. Cl.³ .............................................. F02M 31/00
[52] U.S. Cl. ...................................... 123/557; 165/51; 29/157.3 R
[58] Field of Search ................................ 123/546, 557; 165/154–156, 51, 52; 29/157.3 R, 156.4 WL, 527.5

[56] References Cited

U.S. PATENT DOCUMENTS

| | | | |
|---|---|---|---|
| 2,331,554 | 10/1943 | Irgens | 29/156.4 WL |
| 2,611,585 | 9/1952 | Boling | 165/164 |
| 3,253,647 | 5/1966 | Deshaies | 123/557 |
| 4,015,567 | 4/1977 | Zabenskie | 123/557 |
| 4,086,959 | 5/1978 | Habdas | 165/155 |
| 4,091,782 | 5/1978 | Dunnam | 165/51 |
| 4,218,999 | 8/1980 | Shearer | 123/546 |

Primary Examiner—Charles J. Myhre
Assistant Examiner—E. Rollins Cross
Attorney, Agent, or Firm—Schroeder, Siegfried, Vidas, Steffey & Arrett

[57] ABSTRACT

An inexpensive light-weight diesel fuel warmer having high efficiency, being of small compass, and preventing fuel stagnation and contamination. The warmer is comprised of a cold-rolled steel fuel coil encircling a cast aluminum cylinder in spaced relation, both of which are encapsulated within a cast-aluminum capsule by means of which heat is effectively transferred from the coolant to the fuel.

15 Claims, 3 Drawing Figures

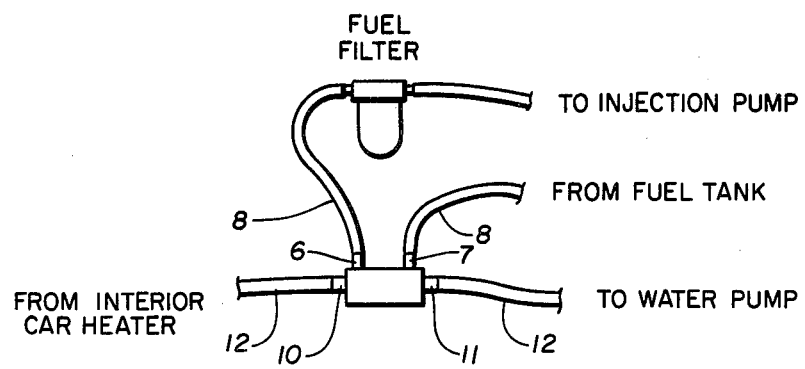
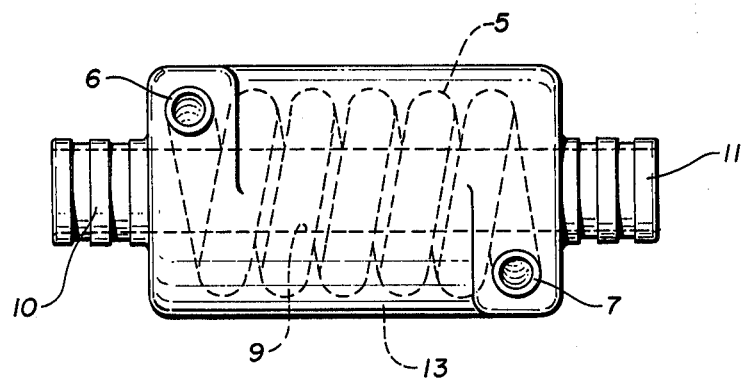
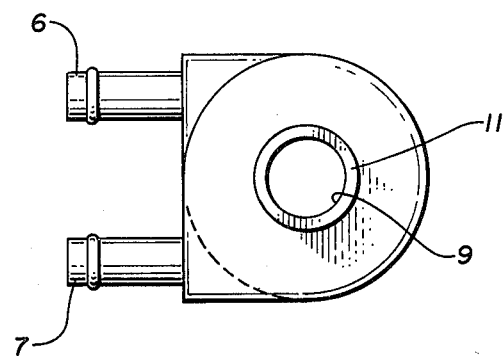

DIESEL FUEL WARMER

DESCRIPTION

BACKGROUND OF PRIOR ART

There is an urgent need for an inexpensive coolant-heated diesel fuel warmer which is light in weight, has a high efficiency, which effectively precludes fuel contamination, and is of small compass so that it can be readily mounted beneath the hood of the vehicle. A primary requirement is that it must somehow preclude coolant from being drawn into the fuel line, which is conventionally under fairly high negative pressure. If this occurs, the fuel injector will burn out and fail, the cylinder walls will be scored, and other consequent damage will result, requiring repairs totalling several thousands of dollars.

Various types of fuel warmers have recently been designed in an attempt to prevent such fuel contamination, but most of these involve the use of relatively bulky chambers. Such chambers permit areas of fuel stagnation to develop therewithin and are also of undesirable size and weight. Modern vehicles are designed to provide very little room under the hood for any structure other than that provided by the original equipment manufacturer, and hence it is important that such a fuel warmer be of minimum size. Those presently on the market approximate eight inches in length and at least two inches in diameter.

Further disadvantages of the chamber type fuel warmers are that the mass thereof is excessive and they cannot be oriented in all directions, as desired. The weight of such a fuel warmer, combined with the weight of the relatively large quantity of fluid therein, provides more momentum than desirable in the event of a crash of the vehicle, frequently resulting in rupture of the fuel line and/or the coolant line. My invention is directed toward obviating each of these now-existent problems.

BRIEF SUMMARY OF THE INVENTION

I have obviated the problems hereinbefore outlined by designing a diesel fuel warmer which is less than four inches long and less than two inches in diameter and is comprised of a cold-rolled steel fuel-conveying coil surrounding, in spaced relation, a cast aluminum coolant conveying cylinder, and a cast aluminum encapsulant encasing the cylinder and coil and holding the same in fixed spaced relation to each other and effectively transmitting heat from the cylinder to the coil and fuel therewithin.

I prefer to produce the coolant conveying cylinder and encapsulant by casting the same in a single operation about the fuel coil. Thus, the cast aluminum encapsulant fills entirely all space between the coil and cylinder, and completely encases the same to thereby effectively and efficiently heat the fuel with absolutely no possibility of coolant being drawn into the fuel in the event of leaks in the coil.

Since the encapsulant is cast aluminum, which has a high degree of heat conductivity, and hence no flat chambers are required, the unit can be made of relatively small compass and yet have a high degree of efficiency. Also, since the cylinder and coil are each encapsulated, the aluminum surrounds the coil entirely and thus is more effective in its heat transmitting function.

Also, the flow of fuel through the coil is direct and confined, and, consequently, it is impossible for areas of fuel stagnation to develop. Moreover, the unit has a substantially smaller mass and, therefore, is substantially less likely to be severely damaged in the event the vehicle upon which it is mounted becomes involved in a crash. Since the coolant cylinder and encapsulant are cast in a single operation of cast aluminum, the unit can be manufactured at a substantially lower cost than other units designed for the same purposes.

BRIEF DESCRIPTION OF THE DRAWINGS

A detailed description of one preferred embodiment of the diesel fuel warmer is hereafter described with specific reference being made to the drawings, in which:

FIG. 1 is a schematic diagram of my diesel fuel warmer in use within a typical diesel fuel system for an internal combustion engine;

FIG. 2 is a top elevational view on an enlarged scale of the fuel warmer, shown in FIG. 1; and FIG. 3 is an end elevational view of the warmer shown in FIG. 2.

DETAILED DESCRIPTION OF INVENTION

The preferred embodiment of my invention includes, as shown in FIGS. 1-3, a helically coiled tube 5 made of cold-rolled steel having an internal diameter of 0.312 inches and end portions 6 and 7 constructed and arranged to be connected or interposed with a fuel line 8 of a conventional internal combustion engine (not shown). If desired, the coiled tube 5 may be formed of cooper, stainless steel or any other material of high heat conductivity. I have chosen cold-rolled steel because of cost considerations.

Extending through the coiled tube 5, as best shown in FIG. 2, is a cast aluminum cylindrical coolant conduit 9 having an internal diameter of one-half ($\frac{1}{2}$″) inch and end portions 10 and 11 which are constructed and arranged to be connected or interposed within the coolant line 12 of such an internal combustion engine. As shown, the conduit 9 extends along the axis of the coils of tube 5.

An encapsulant 13 which is cast aluminum encapsulates the coiled sections of the coiled tube 5, as well as the portions of the conduit 9 which are intermediate its end portions 10 and 11.

To minimize cost of manufacture, the encapsulant 13 and conduit 9 are integrally cast in situ about the coiled section of tube 5, the encapsulant (cast aluminum) completely encasing the coils of the tube 5 so that the inner walls of the coolant conduit 9 are in spaced relation thereto and the coils are secured thereby in fixed encircling relation thereto.

When connected within the fuel line 8 and coolant line 12 of an internal combustion engine, my above described fuel warmer will very effectively heat the fuel passing through fuel line 8. Since cast aluminum is an excellent conductor of heat, heat is readily absorbed from the coolant in line 12 and quickly transmitted to the fuel passing through fuel line 8 and coiled tube 5. My fuel warmer is more efficient than most others because it has more than a mere line contact between the fuel and coolant lines.

Since the cast aluminum completely encases the coils of the tube 5, no possible leak in the latter can cause coolant to be drawn therein. A mass of solid cast aluminum separates the tube 5 and inner walls of the coolant conduit 9 at all points, thus ensuring against possible contamination of the fuel.

Since the manufacture of my fuel warmer requires only the coiling of tube 5 and the casting of the encapsulating cast aluminum therearound, the cost of manufacture is minimal. Also, since the conductivity of heat is excellent, my fuel warmer can be made of minimum size, to thereby further reduce costs of manufacture. As shown, the encapsulant 12 is less than two and three-fourths (2¾") inches in length and less than one and one-half (1½") inches in diameter. The total length of the fuel warmer, including that of the end portions 10 and 11, is less than four inches.

Since my fuel warmer is of minimal size and contains at any given time minimal volumes of liquid, it has distinct advantages in the event the vehicle upon which it is installed crashes. In that event, my fuel warmer has minimum momentum and it is, therefore, less apt to rupture. Moreover, its minimal size permits its installation in vehicles having the most limited space beneath the hood. Fuel warmers of previous types must be of larger construction in order to obtain efficiency as high as that provided by the fuel warmer shown herein.

Another advantage of my fuel warmer is that the flow therethrough is direct and hence it is impossible for stagnant areas of flow to develop therein, as is likely in other types, such as those utilizing flat adjacent chambers. A further advantage is that my fuel warmer may be oriented in any direction or manner and it is of rugged construction so that it is less vulnerable to damage from careless handling or mounting. Moreover, it does not require a mounting bracket since it can be merely interposed within the hoses of the coolant line which inherently provides a resilient mounting.

In considering this invention, it should be remembered that the present disclosure is illustrative only and the scope of the invention should be determined by the appended claims.

I claim:

1. A fuel warmer, comprising:
   (a) a cold-rolled steel helical coil having end portions constructed and arranged to be interposed within the fuel line of a liquid-cooled internal combustion engine; and
   (b) a cast aluminum encapsulant cast in situ around said coil intermediate the said end portions and defining an integrally cast cylindrical coolant conduit extending therethrough;
   (c) said conduit extending along the axis of said coil and having opposite end portions constructed and arranged to be interposed within the coolant line of such a liquid-cooled internal combustion engine; and
   (d) said conduit-defining encapsulant comprising the sole coolant conduit of said fuel warmer.

2. A diesel fuel warmer comprising:
   (a) a cast-aluminum cylindrical coolant conduit having end portions constructed and arranged to be interposed within a coolant line of a liquid-cooled internal combustion engine in coolant-conveying relation;
   (b) a cold-rolled steel helical coil encircling portions of said coolant conduit intermediate its said end portions in substantially spaced relation thereto, said coil having end portions constructed and arranged to be interposed within the fuel line of such a liquid-cooled internal combustion engine in fuel-conveying relation; and
   (c) a solid aluminum capsule encasing said coil and said encircled portions of said cylindrical coolant conduit in heat-transmitting relation therebetween and holding same in fixed substantially spaced relation to each other.

3. A diesel fuel warmer in combination with a liquid-cooled internal combustion engine, the fuel warmer comprising a coil of cold-rolled steel tubing through which diesel fuel is passed prior to supply thereof to the internal engine for combustion, said tubing coil being in substantially spaced encircling relation about an aluminum cylinder through which internal combustion engine coolant is passed, and a heat-transmitting encapsulant encapsulating said coil and the encircled portions of said cylinder in heat-transmitting relation therebetween and holding same in fixed substantially spaced relation.

4. The structure defined in claim 3 wherein said encapsulant is comprised of cast aluminum.

5. The structure defined in claim 3 wherein said fuel warmer is no greater than four inches in length and two inches in diameter.

6. The structure defined in claim 3 wherein said cylinder and said encapsulant are each made of cast aluminum and are integrally cast in situ about said coil and comprise the sole coolant conduit of said fuel warmer.

7. A diesel fuel warmer comprising:
   (a) a heat-transferring coolant conducting conduit having end portions constructed and arranged to be interposed within a coolant line of a liquid-cooled internal combustion engine in coolant-conveying relation;
   (b) a heat-transferring fuel conduit encircling in substantial spaced relation thereto portions of said coolant conduit intermediate its said end portions, and having end portions constructed and arranged to be interposed within the fuel line of such a liquid-cooled internal combustion engine in fuel-conveying relation therethrough; and
   (c) a heat-transferring encapsulant encapsulating said intermediate portions of said coolant conduit and portions of said fuel conduit intermediate its said end portions and holding said coolant conduit and said fuel conduit in fixed substantially spaced heat-transferring relation therebetween.

8. The structure defined in claim 7 wherein said encapsulant is aluminum.

9. The structure defined in claim 7 wherein said encapsulant is cast aluminum.

10. The structure defined in clwaim 7 wherein said fuel conduit is comprised of cold-rolled steel and said coolant conduit is comprised of cast aluminum and said encapsulant is comprised of cast aluminum integrally formed in situ with said coolant conduit.

11. The structure defined in claim 7 wherein said coolant conduit is a cylinder.

12. The structure defined in claim 7 wherein said coolant conducting conduit is a cylinder defined solely by said encapsulant and said fuel conduit is a helical coil extending around said intermediate portions of said coolant conducting conduit, said encapsulant comprising the sole coolant conducting conduit of said diesel fuel warmer.

13. The structure defined in claim 7 wherein said coolant conduit is a cylinder and said fuel conduit is a helical coil extending around said intermediate portions of said coolant conduit and said encapsulant is cast aluminum encasing said intermediate portions of said conduits within an otherwise solid capsule.

14. The structure defined in claim 7 wherein said entire fuel warmer is no greater than four inches in length and two inches in diameter.

15. The structure defined in claim 7 wherein said encapsulant is less than three inches in length and less than two inches in diameter.

* * * * *